(12) United States Patent
Lee et al.

(10) Patent No.: US 11,552,588 B2
(45) Date of Patent: Jan. 10, 2023

(54) SYSTEM AND METHOD FOR INCREASING TEMPERATURE OF BATTERY

(71) Applicants: Hyundai Motor Company, Seoul (KR); Kia Corporation, Seoul (KR)

(72) Inventors: Yong Jae Lee, Yongin-si (KR); Jung Mo Yu, Seoul (KR); Su Hyun Bae, Daegu (KR); Jae Ho Hwang, Daejeon (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/475,740

(22) Filed: Sep. 15, 2021

(65) Prior Publication Data

US 2022/0200504 A1    Jun. 23, 2022

(30) Foreign Application Priority Data

Dec. 21, 2020  (KR) ................. 10-2020-0179874

(51) Int. Cl.
*H02M 7/5387*  (2007.01)
*H01M 10/615*  (2014.01)
(Continued)

(52) U.S. Cl.
CPC .......... *H02P 27/08* (2013.01); *H01M 10/615* (2015.04); *H01M 10/625* (2015.04); *H01M 10/633* (2015.04); *H01M 10/6571* (2015.04); *H02M 7/53871* (2013.01); *H01M 2220/20* (2013.01)

(58) Field of Classification Search
CPC .......... H02P 27/00; H02P 27/04; H02P 27/06; H02P 27/08; H02P 27/085; H02P 1/00;
(Continued)

(56) References Cited

U.S. PATENT DOCUMENTS

2008/0143281 A1   6/2008  Yaguchi
2012/0021263 A1   1/2012  Nishi et al.
(Continued)

FOREIGN PATENT DOCUMENTS

CN   108666713 A   10/2018
CN   108682909 A   10/2018
(Continued)

*Primary Examiner* — Antony M Paul
(74) *Attorney, Agent, or Firm* — Morgan, Lewis & Bockius LLP

(57) ABSTRACT

A system for increasing a temperature of a battery includes: an inverter comprising a plurality of legs corresponding to a plurality of phases, respectively, wherein each of the legs comprises a pair of switching elements connected in series to both terminals of the battery, respectively; a motor comprising a plurality of coils corresponding to the plurality of phases, respectively, wherein each of the plurality of coils has one end connected to a connection node between the pair of switching elements included in each leg of the inverter, each leg corresponding to each of the plurality of coils, and other ends of plurality of coils are connected to each other; and a controller generating a battery application AC current applied to the battery by controlling on and off states of the pair of switching elements included in the legs of the inverter.

12 Claims, 6 Drawing Sheets

(51) Int. Cl.
*H01M 10/633* (2014.01)
*H01M 10/6571* (2014.01)
*H01M 10/625* (2014.01)
*H02P 27/08* (2006.01)

(58) Field of Classification Search
CPC ...... H02P 1/04; H02P 1/16; H02P 1/18; H02P 1/24; H02P 1/26; H02P 1/42; H02P 1/426; H02P 1/46; H02P 1/52; H02P 6/00; H02P 6/14; H02P 6/28; H02P 6/32; H02P 7/00; H02P 7/29; H02P 711/00; H02P 11/06; H02P 21/00; H02P 21/22; H02P 21/14; H02P 23/00; H02P 23/14; H02P 23/28; H02P 25/00; H02P 25/062; H02P 25/064; H02P 29/00; H02P 29/68; H02M 7/5387; H01M 10/615; H01M 2220/20; H01M 10/633; H01M 10/6571; H01M 10/625
See application file for complete search history.

(56) References Cited

U.S. PATENT DOCUMENTS

| | | |
|---|---|---|
| 2012/0200241 A1 | 8/2012 | Kojima et al. |
| 2015/0318811 A1 | 11/2015 | Ota |
| 2019/0359061 A1 | 11/2019 | Dan et al. |
| 2019/0359082 A1 | 11/2019 | Hou et al. |
| 2019/0363408 A1 | 11/2019 | Dan et al. |
| 2019/0363550 A1 | 11/2019 | Zuo et al. |
| 2019/0363562 A1 | 11/2019 | Dan et al. |
| 2019/0363563 A1 | 11/2019 | Zhang et al. |
| 2021/0061128 A1 | 3/2021 | Lee et al. |
| 2021/0075073 A1 | 3/2021 | Hou et al. |
| 2021/0249707 A1 | 8/2021 | Zuo et al. |
| 2022/0158574 A1* | 5/2022 | Hao ............... H02P 6/16 |

FOREIGN PATENT DOCUMENTS

| | | |
|---|---|---|
| CN | 108705943 A | 10/2018 |
| CN | 108711662 A | 10/2018 |
| CN | 108736107 A | 11/2018 |
| CN | 108736108 A | 11/2018 |
| CN | 108878996 A | 11/2018 |
| CN | 108879027 A | 11/2018 |
| JP | 2007-026700 A | 2/2007 |
| JP | 2012-165526 A | 8/2012 |
| JP | 2014-072955 A | 4/2014 |
| JP | 2015-213390 A | 11/2015 |
| KR | 10-1358367 B1 | 2/2014 |
| KR | 10-2021-0027663 A | 3/2021 |
| KR | 10-2022-0006271 A | 1/2022 |
| KR | 10-2022-0026970 A | 3/2022 |

* cited by examiner

SYSTEM AND METHOD FOR INCREASING TEMPERATURE OF BATTERY

CROSS REFERENCE TO RELATED APPLICATION

The present application claims the benefit of priority to Korean Patent Application No. 10-2020-0179874 filed on Dec. 21, 2020 in the Korean Intellectual Property Office, the entire contents of which is incorporated herein for all purposes by this reference.

TECHNICAL FIELD

The present disclosure relates to a system and a method for increasing a temperature of a battery using a motor drive system, and more particularly, to a system and a method for increasing a temperature of a battery using a motor drive system provided in a vehicle and including an inverter and a motor, the system and method being configured to properly determine the frequency of an AC current when applying the AC current to a battery so that the battery may be repetitively charged and discharged.

BACKGROUND

In general, each of eco-friendly vehicles driven using electrical energy may include a battery storing electrical energy, an inverter converting the electrical energy stored in the battery into alternating current (AC) power having a plurality of phases, and a motor generating rotating kinetic energy of rotation using the AC power converted by the inverter.

Batteries used in eco-friendly vehicles have been mainly manufactured as lithium (Li)-ion batteries. Li-ion batteries have excellent energy density at room temperature and outstanding performance in consideration of charge and discharge cycles. However, Li-ion batteries have drawbacks, such as reduced capacity, increased resistance, and reduced efficiency at low temperature, due to characteristics of electrolytes thereof. In particular, when Li-ion batteries are charged at low temperature or overcharged, Li ions may be non-uniformly deposited on the surface of an anode, thereby reducing the lifetime of batteries. In this regard, Li-ion batteries require a temperature-increasing device able to rapidly and efficiently increase the temperature of batteries from a low-temperature state to a high-temperature state.

In the related art, a method of directly heating a battery or circulating cooling water supplied to the battery by heating the cooling water by adding a heater (e.g., a positive temperature coefficient (PTC) heater) to batteries has been used. However, since a separate heater must be added, the related-art method of increasing the temperature of a battery has problems, such as additional increases in cost and volume.

As another method of increasing the temperature of a battery in the related art, a method of generating heat within a battery by an electrical method has been studied. This method uses the internal resistance of the battery. That is, this method causes current to flow through the battery so as to use loss produced in proportion to the amount of current flowing through the battery as heat. This method has an advantage in that heat is uniformly increased in the battery since current uniformly flows through the battery. However, a separate dedicated circuit for causing current to flow to the battery must be used, thereby resulting in additional increases in volume and cost as well. In addition, the dedicated circuit for generating and flowing current for increasing the temperature of the battery must be additionally managed, thereby causing the management of a vehicle to be complicated, which is problematic.

Accordingly, the applicant of this application previously filed a system and method for increasing the temperature of a battery. The previously-filed system and method may apply an AC current to a battery using a motor drive system without a separate dedicated circuit in order to increase the temperature of the battery.

The previously-filed system and method for increasing the temperature of a battery using the motor drive system are configured to apply a high-frequency AC current to the battery using an inverter circuit for driving the motor and coils provided in the motor while reducing torque generated by the motor as most as possible. The frequency of the AC current applied needs to be properly determined according to the characteristics of the system.

The foregoing explained as the background is intended merely to aid in the understanding of the background of the present disclosure, and is not intended to mean that the present disclosure falls within the purview of the related art that is already known to those skilled in the art.

SUMMARY OF THE DISCLOSURE

The present disclosure is proposed to solve the above problem, and an object of the present disclosure is to provide a system and method for increasing the temperature of a battery, the system and method being configured to properly determine the frequency of an AC current according to the characteristics of the system when applying the AC current to the battery using a motor drive system provided in a vehicle and including an inverter and a motor so that the battery may be repetitively charged and discharged.

In order to achieve the above objectives, according to one aspect of the present disclosure, provided is a system for increasing a temperature of a battery. The system may include: an inverter including a plurality of legs corresponding to a plurality of phases, respectively, wherein each of the legs includes a pair of switching elements connected in series to both terminals of the battery; a motor including a plurality of coils corresponding to the plurality of phases, respectively, wherein each of the plurality of coils has one end connected to a connection node between the pair of switching elements included in the leg corresponding thereto, and other ends of plurality of coils are connected to each other; and a controller generating a battery application AC current applied to the battery by controlling on and off states of the pair of switching elements included in the legs of the inverter in a preset method, wherein the controller derives a relationship between a first magnitude and a first frequency of the AC current in accordance with a preset maximum application AC voltage applicable to the battery and determines the first magnitude and the first frequency of the battery application AC current in accordance with a first relationship corresponding to a relationship between a second magnitude and a second frequency of a preset allowed application current of the battery, a second relationship corresponding to a relationship between a third magnitude and a third frequency of the AC current determined in accordance with limitations of switching frequencies of the pair of switching elements, and a third relationship corresponding to a relationship between a fourth magnitude and a fourth frequency of the AC current derived in accordance with the preset maximum application AC voltage applicable to the battery.

According to an embodiment, the controller may determine the first relationship in accordance with a temperature of the battery.

According to an embodiment, the controller may determine the second relationship in accordance with a temperature of cooling water for cooling the switching elements in the inverter.

According to an embodiment, the controller may derive the third relationship using the following formula:

$$I_{ac,max} = \frac{V_{ac,max}}{2\pi f_{inj} L_{dq}},$$

where $I_{ac,max}$ is a maximum value of the AC current, $V_{ac,max}$ is the preset maximum application AC voltage, $f_{inj}$ is the frequency of the AC current, and $L_{dq}$ is an equivalent inductance of the motor depending on a position of a rotor of the motor.

According to an embodiment, the controller may determine a magnitude and a frequency of the AC current satisfying all of the first relationship, the second relationship, and the third relationship to be the magnitude and the frequency of the AC current applied to the battery, determines a magnitude of the AC voltage applied to the battery in accordance with the determined magnitude of the AC current applied to the battery, and determines switching duties of the switching elements in accordance with the determined magnitude of the AC voltage.

According to an embodiment, the controller may determine switching frequencies of the switching elements in accordance with a preset method of switching the switching elements and the frequency of the AC current applied to the battery.

In order to achieve the above objectives, according to another aspect of the present disclosure, provided is a method of increasing a temperature of a battery using a motor drive system, which includes an inverter including a plurality of legs corresponding to a plurality of phases, respectively, wherein each of the legs includes a pair of switching elements connected in series to both terminals of the battery, and a motor including a plurality of coils corresponding to the plurality of phases, respectively, wherein each of the plurality of coils has one end connected to a connection node between the pair of switching elements included in the leg corresponding thereto, and other ends of plurality of coils are connected to each other. The may method include: receiving, by a controller, a voltage of the battery and a position of a rotor of the motor; determining, by the controller, a preset maximum value of an application AC voltage applicable to the battery by a method of switching the pair of switching elements; deriving, by the controller, a first relationship corresponding to a relationship between a first magnitude and a first frequency of a preset allowed application current of the battery, a second relationship corresponding to a relationship between a second magnitude and a second frequency of an AC current determined in accordance with limitations of switching frequencies of the pair of switching elements, and a third relationship corresponding to a relationship between a third magnitude and a third frequency of the AC current derived in accordance with the preset maximum application AC voltage applicable to the battery; and determining, by the controller, a fourth magnitude and a fourth frequency of an AC current satisfying all of the first relationship, the second relationship, and the third relationship to be a fifth magnitude and a fifth frequency of an AC current applied to the battery.

According to an embodiment, in the receiving, the controller may further receive a temperature of the battery. In the determining of the preset maximum value, the controller may determine the first relationship in accordance with the received temperature of the battery.

According to an embodiment, in the receiving, the controller may further receive a temperature of cooling water for cooling the switching elements in the inverter. In the determining of the preset maximum value, the controller may determine the second relationship in accordance with the received temperature of the cooling water.

According to an embodiment, in the determining of the preset maximum value, the controller may derive the third relationship using the following formula:

$$I_{ac,max} = \frac{V_{ac,max}}{2\pi f_{inj} L_{dq}},$$

where $I_{ac,max}$ is a maximum value of the AC current, $V_{ac,max}$ is the preset maximum application AC voltage, $f_{inj}$ is the frequency of the AC current, and $L_{dq}$ is an equivalent inductance of the motor depending on a position of a rotor of the motor.

According to an embodiment, in the determining of the magnitude and the frequency of the AC current applied to the battery, the controller may determine the magnitude and the frequency of the AC current satisfying all of the first relationship, the second relationship, and the third relationship to be the magnitude and the frequency of the AC current applied to the battery, determines a magnitude of the AC voltage applied to the battery in accordance with the determined magnitude of the AC current applied to the battery, and determines switching duties of the switching elements in accordance with the determined magnitude of the AC voltage.

According to an embodiment, in the determining of the magnitude and the frequency of the AC current applied to the battery, the controller may determine switching frequencies of the switching elements in accordance with a preset method of switching the switching elements and the frequency of the AC current applied to the battery.

The system and method for increasing the temperature of a battery using a motor drive system may apply the AC current to the battery using the inverter and the motor connected to the battery necessarily provided for the driving of an eco-friendly vehicle without a separate temperature-increasing device such as a heater, thereby efficiency increasing the temperature of the battery without an additional increase in cost.

In particular, the system and method for increasing the temperature of a battery using a motor drive system according to a variety of embodiments of the present disclosure may determine the magnitude and the frequency of the AC current in consideration of a variety of conditions required for the stable operation of the system, thereby stably increasing the temperature of the battery without causing overload or damage to the system.

The effects obtainable from the present disclosure are not limited to the aforementioned effects, and other effects not explicitly disclosed herein will be clearly understood by those skilled in the art to which the present disclosure pertains from the description provided hereinafter.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE DISCLOSURE

Hereinafter, a system for increasing the temperature of a battery using a motor drive system according to a variety of embodiments of the present disclosure will be described in detail with reference to the accompanying drawings.

Figure 1:
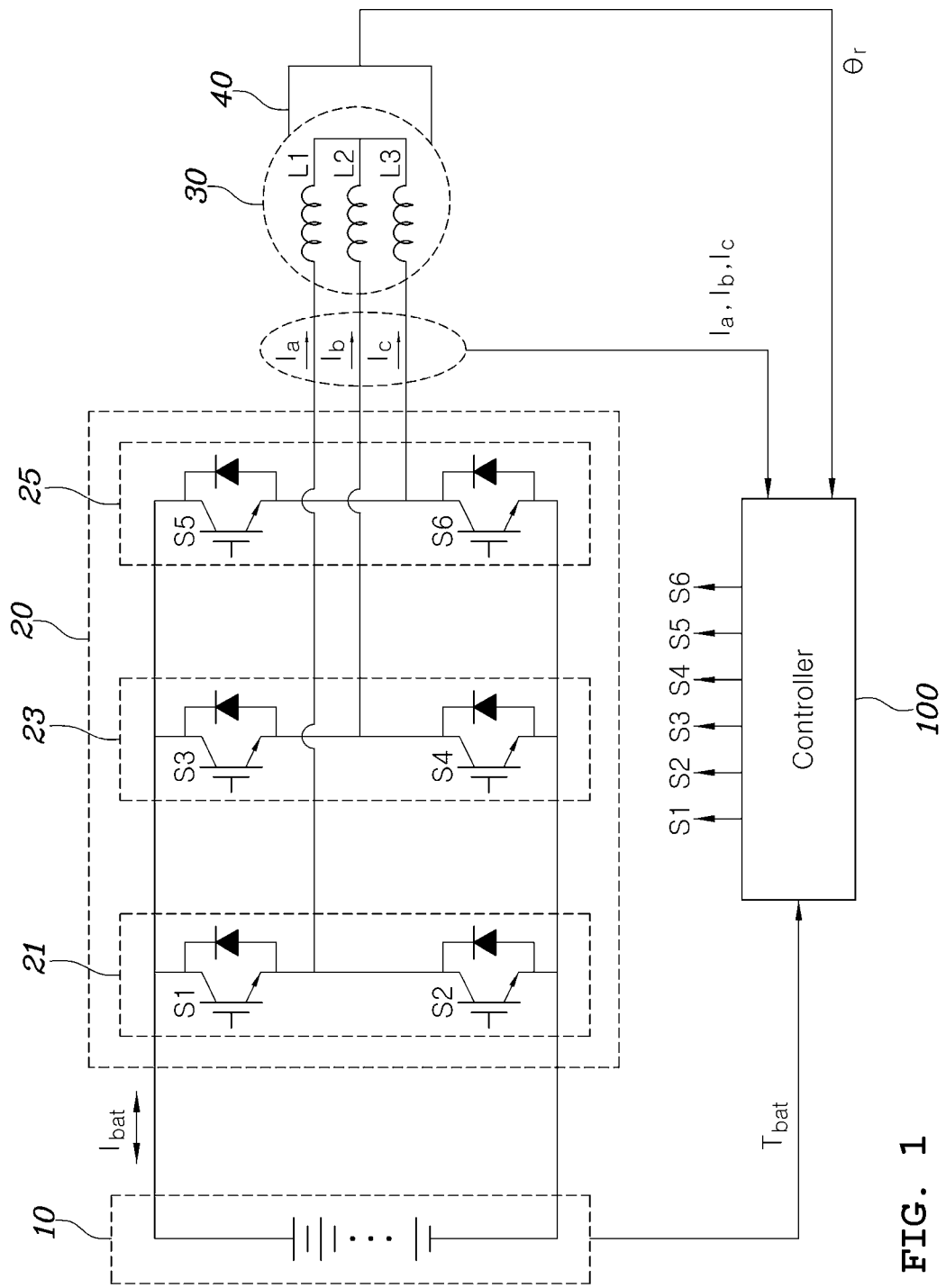
FIG. 1 is a circuit diagram illustrating a system for increasing the temperature of a battery using a motor drive system according to an embodiment of the present disclosure.

FIG. 1 is a circuit diagram illustrating a system for increasing the temperature of a battery using a motor drive system according to an embodiment of the present disclosure.

As illustrated in FIG. 1, a typical system for driving a motor 30 may include a battery 10 serving as an energy storage unit in which power for driving the motor 30 is stored and an inverter 20 converting direct current (DC) power stored in the battery 10 into alternating current (AC) power having a plurality of phases and providing the converted AC power to the motor 30. The inverter 20 includes three legs 21, 23, and 25 connected to both terminals of the battery 10, respectively, in parallel relationship. Each of the legs 21, 23, and 25 has a pair of switching elements (i.e., two switching elements from among switching elements S1 to S6) connected in series. Drive power having a single phase is provided from a connecting node of the two switching elements to the motor 30. For this motor driving, the pulse width modulation of the switching elements S1 to S6 in the inverter 20 may be controlled so that current may be provided to the motor 30 by a current command corresponding to the torque of the motor 30 intended to be obtained through the driving of the motor 30.

The system for increasing the temperature of a battery using a motor drive system according to an embodiment of the present disclosure controls the states of the switching elements S1 to S6 in the inverter 20 using the above-described typical motor drive system so that an AC current (i.e., pulsed current) may be applied to the battery 10.

Specifically, the system for increasing the temperature of a battery using a motor drive system according to an embodiment of the present disclosure may include: the battery 10; the inverter 20 including the plurality of legs 21, 23, and 25 each having a pair of switching elements from among the switching elements S1 to S6 connected in series to both terminals of the battery 10; the motor 30 including a plurality of coils L1, L2, and L3 connected to connection nodes of the switching elements included in the legs 21, 23, and 25 of the inverter 20, respectively; and a controller 100 generating an AC current to be applied to the battery 10 by properly controlling the states of the switching elements included in the connected inverter 20 and the plurality of legs of the inverter 20.

When heat generated by the internal resistance of the battery 10 is used in order to increase the temperature of the battery 10, significantly important factors that should be considered are the amount of heat generated and the efficiency of the use of heat.

First, the amount of heat generated is proportional to the amount of current flowing through the battery 10. That is, a greater amount of heat is generated when a greater amount of current flows, regardless of the internal resistance of the battery 10. In consideration of this feature, the amount of charge or the amount of discharge may be increased by a charging operation of supplying DC current to the battery 10 or a discharging operation of outputting DC current from the battery 10, thereby increasing the amount of heat generated by the battery 10.

Next, it may be more preferable to alternately perform the charging and the discharging of the battery 10 than performing only one of the charging and the discharging of the battery 10 in order to improve the efficiency. When the charging and the discharging of the battery 10 as described above is performed alternately, the amount of current flowing through the battery 10 may be increased even in the case that a small amount of energy is consumed by the battery 10, thereby significantly increasing the amount of heat generated while improving energy efficiency. That is, when an AC current instead of a DC current is applied to the battery 10, the output of current from the battery 10 and the input of current to the battery 10 may be repeated, thereby inducing the battery 10 to generate heat with a high energy efficiency.

Here, an AC current having a sufficiently high frequency may generate heat in the battery 10 while preventing lithium (Li) precipitation within the battery 10 and resultant aging of the battery 10.

In consideration of this feature, according to a variety of embodiments of the present disclosure, the switching elements S1 to S6 in the inverter 20 may be controlled so that the high-frequency AC current may be applied to the battery.

In order to apply the AC current to the battery 10, operations of receiving energy from the battery 10, storing the received energy, and providing the stored energy to the battery 10 again are necessary. Here, in order to store energy required, according to a variety of embodiments of the present disclosure, the coils L1, L2, and L3 corresponding to a plurality of phases, provided in the motor 30, may be used. That is, the AC current may be applied to the battery 10 by causing energy to be stored in and discharged from the coils L1, L2, and L3 of the motor 30.

In addition, in order to increase the temperature of the battery 10 by applying the high-frequency AC current to the battery 10 using the inverter 20 and the motor 30, it is required to reduce torque generated by the motor 30 while ensuring the current of the battery as described above.

The system for increasing the temperature of a battery using a motor drive system according to an embodiment of the present disclosure controls the switching states of the switching elements S1 to S6 in the inverter 20 so that the AC current (i.e., pulsed current) may be applied to the battery 10 while the generation of torque by the motor 30 is reduced using the above-described typical motor drive system. In particular, the system for increasing the temperature of a battery using a motor drive system according to an embodiment of the present disclosure relates to determination of the frequency of the AC current applied to the battery 10.

As described above, the applicant of this application previously filed several technologies for controlling the switching states of the switching elements S1 to S6 in the inverter 20 so that the AC current (i.e., pulsed current) may be applied to the battery 10 while reducing torque generated by the motor 30 using a typical motor drive system.

For example, a first related art relates to a method of generating an AC current applied to the battery 10 by controlling the states of the switching elements included in two legs among the plurality of legs 21, 23, and 25 of the inverter 20. More specifically, Korean Patent Application No. 10-2019-0107408 discloses a technology for controlling two legs among the plurality of legs 21, 23, and 25 in the inverter 20 on the basis of the position of the rotor of the motor so that two switching elements included in each of the two legs are in a complementary relationship. In addition, the switching elements included in each of the legs and connected to both terminals of a battery are controlled to be in a complementary relationship.

As another example, a second related art discloses a technology for controlling switching elements included in the plurality of legs 21, 23, and 25 in the inverter 20 so that switching elements included in one leg and switching elements included in the remaining two legs are in a complementary relationship.

As another example, a third related art discloses a technology for controlling the switching elements S1 to S6 included in the plurality of legs of the inverter 20 so that a first section in which some of the switching elements S1 to S6 are turned on and a second section in which all of the switching elements S1 to S6 are turned off are alternately repeated.

All of the above-described previously-filed technologies are technologies for controlling the switching states of at least some of the switching elements S1 to S6 in the inverter 20 so that the AC current (i.e., pulsed current) may be applied to the battery 10, and are required to determining the switching frequencies of the switching elements to be switched. The switching frequencies of the switching elements may be determined by determining the frequency of the AC current applied to the battery 10.

A variety of embodiments of the present disclosure relate to a technology for determining the frequency of the AC current (i.e., pulsed current) applied to the battery 10.

The method of determining the frequency of the AC current applied may be realized by the controller 100 executing a previously-stored frequency determination algorithm. The controller 100 may determine the frequencies of switching elements after having determined the frequency of the AC current applied to the battery, and may control the switching elements according to the determined switching frequencies so that the AC current for increasing the temperature of the battery is generated by the previously-filed switching methods.

In the generation of the AC current for increasing the temperature of the battery using a motor drive system, the following factors should be considered for components of the motor drive system.

Figure 2:
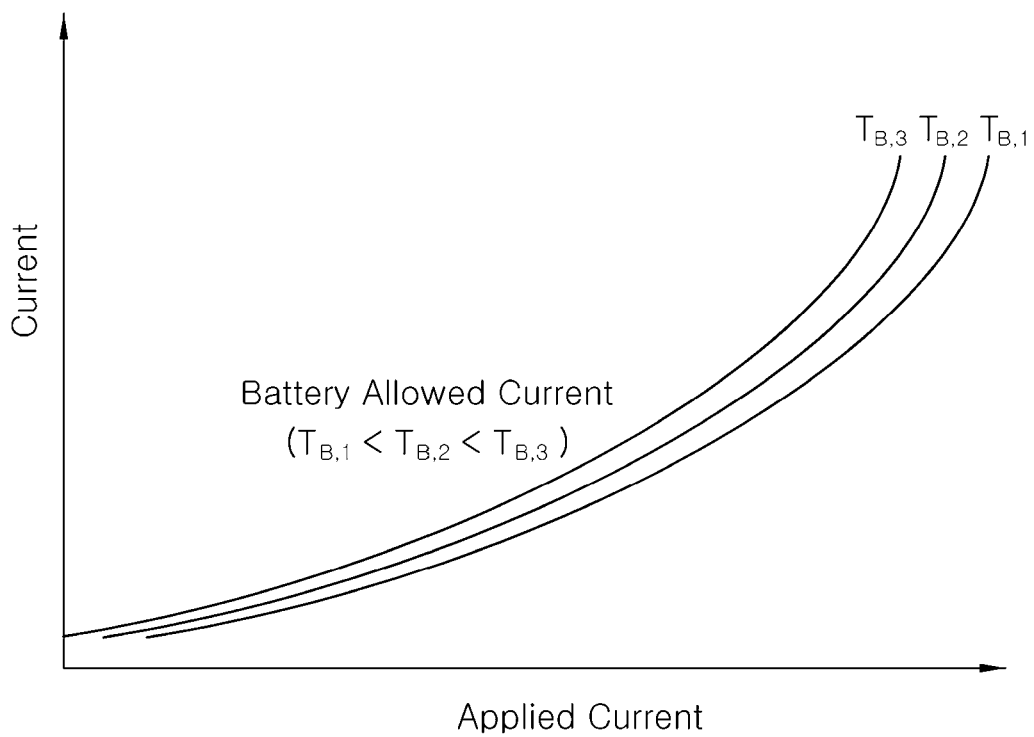
FIGS. 2 to 4 are graphs illustrating the relationships of frequency-current magnitudes with respect to factors that should be considered for components of the system when an AC current for increasing the temperature of the battery is generated in the system and method for increasing the temperature of a battery using a motor drive system according to an embodiment of the present disclosure.
Figure 3:
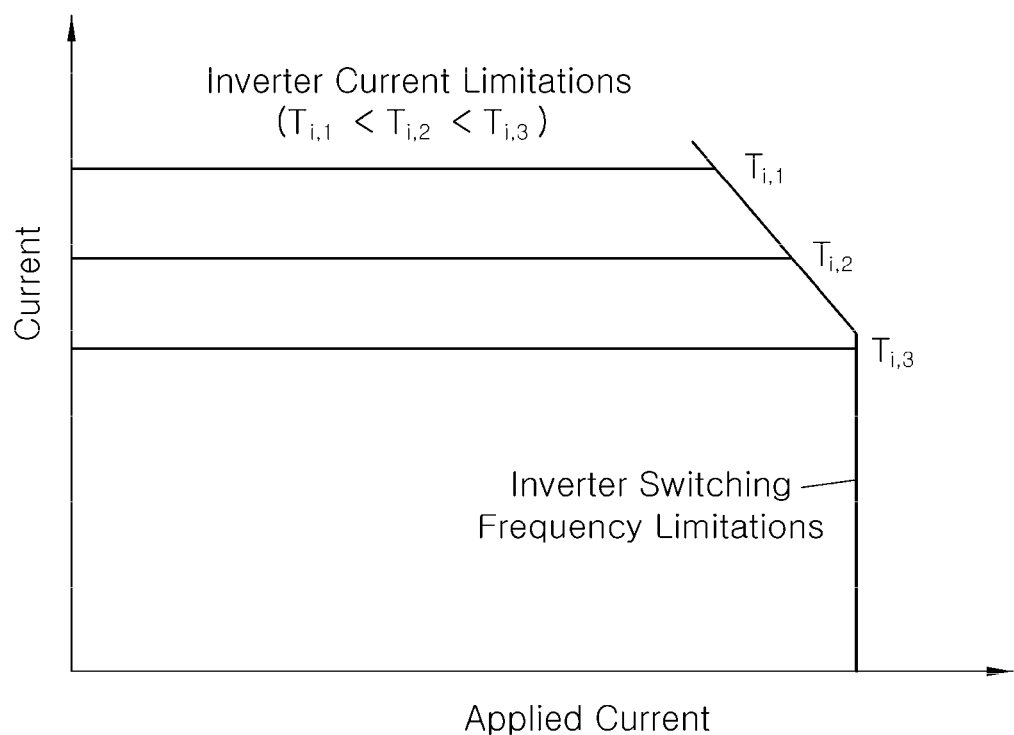
Figure 4:
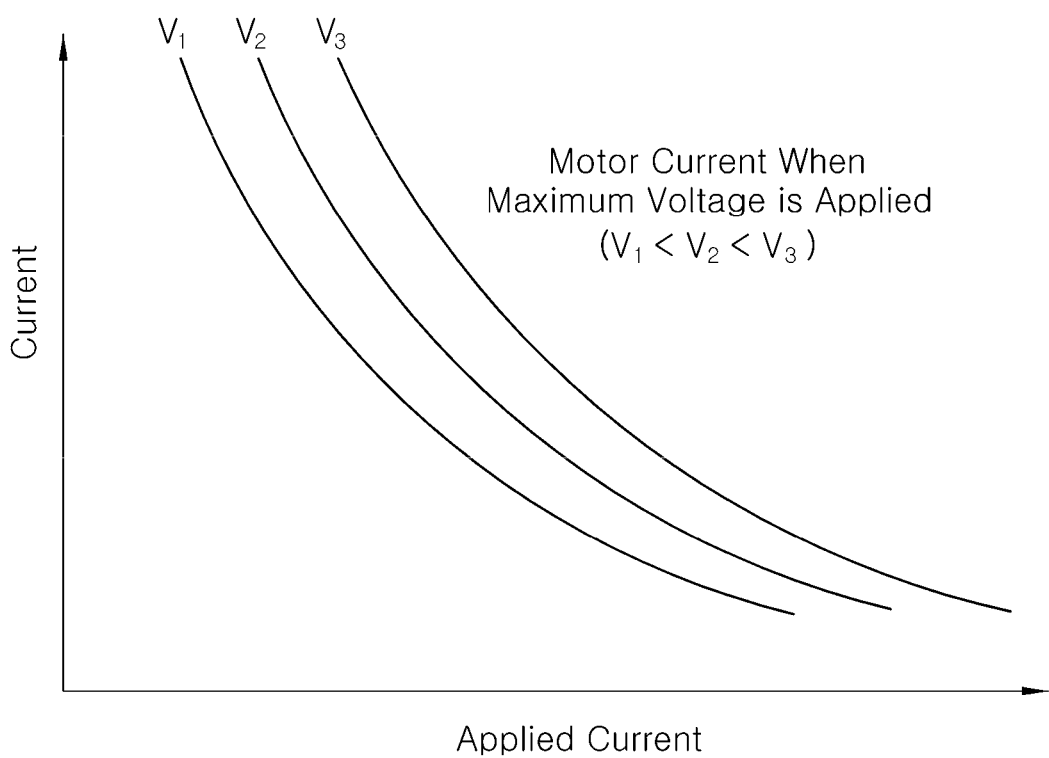

FIGS. 2 to 4 are graphs illustrating the relationships of frequency-current magnitudes with respect to factors that should be considered for components of the system in the system and method for increasing the temperature of a battery using a motor drive system according to an embodiment of the present disclosure when an AC current for increasing the temperature of the battery is generated.

First, FIG. 2 is a graph illustrating allowable currents of the battery. Referring to FIG. 2, in the battery 10, the magnitude of the amount of current input to or output from the battery 10 is limited depending on the characteristics of the battery 10. In particular, when an amount of current greater than a predetermined reference is input to the battery 10 or output from the battery 10 during cooling in which the temperature of the battery is low, the lifetime of the battery is reduced, which is problematic.

In consideration of this feature, the current input to or output from the battery 10 may be preset to be an allowable value on the basis of the characteristics of the battery 10.

In case of the AC current applicable to the battery 10, a greater amount of current may flow through the battery, since the limitations of current that may flow through the battery are relatively insignificant. As illustrated in FIG. 2, the higher the frequency of the AC current, the greater the magnitude of the current allowed to the battery 10 may be.

Thus, according to an embodiment of the present disclosure, the allowable current of the battery 10 according to the temperature of the battery should be considered in order to determine the frequency of the AC current applied to the battery.

Next, FIG. 3 is a graph illustrating current limitation characteristics in which the characteristics of the inverter are considered. Referring to FIG. 3, in the inverter 20, the amount of the AC current needs to be limited on the basis of the switching frequency in order to prevent the switching losses of the switching elements S1 to S6 provided in the inverter and damage due to heat generated in the switching elements by conduction losses. That is, a greater AC current may be allowed when the switching frequency is relatively low than when the switching frequency is high. Referring to the details disclosed in the above-described previously-filed applications, the frequency of the AC current applied to the battery 10 may be determined by the frequencies of the switching elements S1 to S6. Thus, the limitation of the frequency of the AC current may be determined due to the limitation of the switching frequency.

In addition, the limitations of the switching frequencies of the switching elements S1 to S6 may be determined differently depending on the temperature of the cooling water prepared to cool a power module including the switching elements S1 to S6. For example, when the temperature of the cooling water is lower, a relatively-greater amount of current may be allowed. When the temperature of the cooling water is higher, the magnitude of allowable current may be reduced relatively.

Next, FIG. 4 illustrates current limitation characteristics in which the characteristics of the motor are considered. In the motor, the magnitude of a voltage may be limited depending on the method of switching the switching elements for generating the voltage of the battery 10 and the AC current, since the impedance of the motor itself is preset.

For example, in a case in which the AC current applied to the battery 10 is generated by controlling the states of the switching elements included in two legs among the plurality of legs 21, 23, and 25 in the inverter 20 as disclosed in Korean Patent Application No. 10-2019-0107408, the maximum value of the AC voltage may be limited to the battery voltage.

As another example, in a case in which the switching elements included in one leg among the plurality of legs 21, 23, and 25 in the inverter 20 and the switching elements included in the remaining two legs are controlled in a complementary relationship are alternately repeated as disclosed in Korean Patent Application No. 10-2020-0084031, the maximum value of the AC voltage may be limited to be 4/3 of the battery voltage.

As sill another example, in a case in which the switching elements S1 to S6 included in the plurality of legs in the inverter 20 are controlled so that the first section in which some of the switching elements S1 to S6 are turned on and the second section in which all of the switching elements S1 to S6 are turned off as disclosed in Korean Patent Application No. 10-2020-0108170, the maximum value of the AC voltage may be limited to a value obtained by reflecting a system efficiency coefficient (i.e., a value from 0 to 1) to 4/3 of the battery voltage.

As described above, in consideration of the maximum value of the AC voltage preset by the impedance and the switching method of the motor, the maximum value of the AC current applied to the battery 10 may be determined by Formula 1 below:

$$I_{ac,max} = \frac{V_{ac,max}}{2\pi f_{inj} L_{dq}} \qquad \text{[Formula 1]}$$

In Formula 1 above, $I_{ac,max}$ is the maximum value of the AC current, $V_{ac,max}$ is the maximum value of the AC voltage, $f_{inj}$ is the frequency of the AC current, and $L_{dq}$ is the equivalent inductance of the motor depending on the position of the rotor of the motor.

As represented in Formula 1 above, the AC current may be inversely proportional to the frequency of the AC current and be determined depending on the magnitude of the maximum value of the AC voltage as illustrated in FIG. 4.

Figure 5:
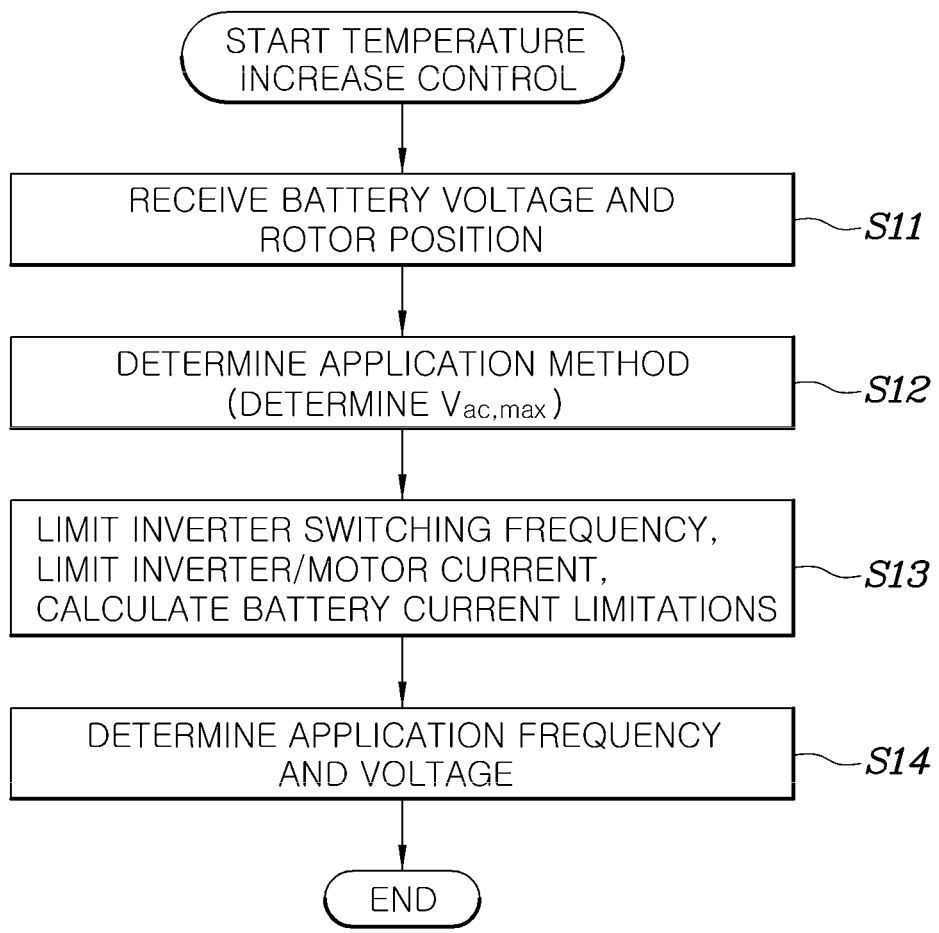
FIG. 5 is a flowchart illustrating the method of increasing the temperature of a battery using a motor drive system according to an embodiment of the present disclosure.

FIG. 5 is a flowchart illustrating the method of increasing the temperature of a battery using a motor drive system according to an embodiment of the present disclosure. The system for increasing the temperature of a battery using a motor drive system according to an embodiment of the present disclosure may determine the switching frequencies of switching elements for increasing the temperature of the battery and apply the AC current of the battery 10 by controlling the switching elements S1 to S6 of the inverter 20 using the operations illustrated in FIG. 5.

Referring to FIG. 5, first, the controller 100 may receive the voltage of the battery 10 and the position of the rotor of the motor 30 in S11. The voltage of the battery 10 may be input from a voltage sensor (not shown) disposed between terminals of the battery 10, and the position of the rotor of the motor 30 may be input from a rotor position sensor 40, such as a resolver, disposed on the motor 30.

In addition, in the step S11, the controller 100 may also receive information regarding battery temperatures $T_{B,1}$, $T_{B,2}$, and $T_{B,3}$ and cooling water temperatures $T_{i,1}$, $T_{i,2}$, and $T_{i,3}$ of the inverter 20. The battery temperatures $T_{B,1}$, $T_{B,2}$, and $T_{B,3}$ and the cooling water temperatures $T_{i,1}$, $T_{i,2}$, and $T_{i,3}$ of the inverter 20 may be input from temperature sensors (not shown) disposed in the battery 10 and the inverter 20, respectively.

Afterwards, the controller 100 may determine maximum values $V_{ac,max}$, $V_1$, $V_2$, and $V_3$ of the AC voltage applied to the battery, preset by a current application method (i.e., a method of switching the switching elements) in S12.

Subsequently, in S13, the controller 100 may derive the relationship between the magnitude of the current applied to the battery and the applied frequency of the applied current previously set on the basis of the battery temperatures $T_{B,1}$, $T_{B,2}$, and $T_{B,3}$ as illustrated in FIG. 2, the relationship between the magnitude of the current applied to the battery and the frequency of the applied current previously set on the basis of the limitation of the switching frequency of the switching elements in the inverter 20 and the limitation of the inverter current depending on the cooling water temperature of the inverter 20 as illustrated in FIG. 3, and the relationship between the magnitude of the applied current and the frequency of the applied current by applying Formula 1 above on the basis of the maximum values $V_{ac,max}$, $V_1$, $V_2$, and $V_3$ of the AC voltage applied to the battery as illustrated in FIG. 4.

The position of the rotor received in the step S11 may be used in the step S13 to derive the relationship between the magnitude of the applied current and the frequency of the applied current by using Formula 1.

Figure 6:
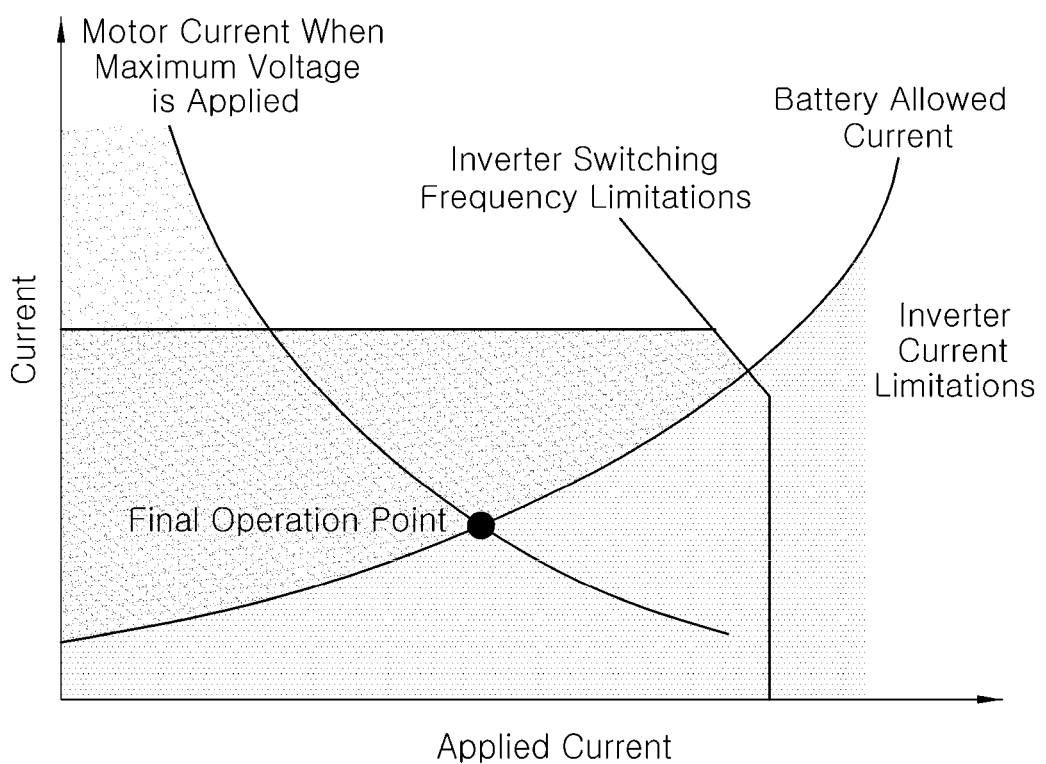
FIG. 6 is a graph illustrating an example in which the magnitude and the frequency of a current applied to the battery are determined in the system and method for increasing the temperature of a battery using a motor drive system according to an embodiment of the present disclosure.

The magnitude of the AC current and the frequency of the AC current determined in the step S13 are illustrated in FIG. 6.

FIG. 6 is a graph illustrating an example in which the magnitude and the frequency of the current applied to the battery are determined in the system and method for increasing the temperature of a battery using a motor drive system according to an embodiment of the present disclosure.

As illustrated in FIG. 6, the magnitude and the frequency of the current applied to the battery may be determined within a range satisfying all of the limitation conditions illustrated in FIGS. 2 to 4 by collecting all of a battery applicable current curve depending on the temperature of the battery 10, a battery applicable current curve derived on the basis of a maximum value of a battery applicable AC voltage determined by the method of switching the switching elements for applying the AC current to the battery 10, and a switching frequency limitation curve and an inverter current limitation curve depending on the cooling water temperature of the inverter 20.

Subsequently, the controller 100 may determine the switching duties of the switching elements so that an application voltage depending on the magnitude and the frequency of the battery application current determined in the step S13 may be determined and the determined application voltage may be output, and may determine the switching frequencies of the switching elements on the basis of the switching method (e.g., the switching method disclosed in one of the above-described previously-filed applications) for applying the predetermined AC current and the frequency of the determined application AC current. In addition, the controller 100 may control the switching elements S1 to S6 in a pulse width modulation manner on the basis of the switching frequencies and the switching duties of the switching elements as determined above, thereby causing the AC current to be applied to the battery 10.

Descriptions of specific switching methods of applying the AC current to the battery 10 will be omitted, since details thereof are disclosed in the above-described previously-filed applications.

As set forth above, the system and method for increasing the temperature of a battery using a motor drive system according to a variety of embodiments of the present disclosure may apply the AC current to the battery using the inverter and the motor connected to the battery provided for the driving of an eco-friendly vehicle without a separate temperature-increasing device, thereby efficiency increasing the temperature of the battery without an additional increase in cost. In particular, the system and method for increasing the temperature of a battery using a motor drive system according to a variety of embodiments of the present disclosure may determine the magnitude and the frequency of the AC current in consideration of a variety of conditions required for the stable operation of the system, thereby stably increasing the temperature of the battery without causing overload or damage to the system.

While the specific exemplary embodiments of the present disclosure have been illustrated and described, it will be apparent to those skilled in the art that various improvements and changes of the present disclosure are possible without departing from the technical spirit of the present disclosure provided by the appended claims.

What is claimed is:

1. A system for increasing a temperature of a battery, the system comprising:
   an inverter comprising a plurality of legs corresponding to a plurality of phases, respectively, wherein each of the legs comprises a pair of switching elements connected in series to both terminals of the battery, respectively;
   a motor comprising a plurality of coils corresponding to the plurality of phases, respectively, wherein each of the plurality of coils has one end connected to a connection node between the pair of switching elements included in each leg of the inverter, each leg corresponding to each of the plurality of coils, and other ends of plurality of coils are connected to each other; and
   a controller generating a battery application AC current applied to the battery by controlling on and off states of the pair of switching elements included in the plurality of legs of the inverter, wherein the controller is configured to:
      determining a preset maximum value of an application AC voltage applicable to the battery by a preset method of switching the pair of switching elements; and
      determine a fourth magnitude and the frequency of the generated battery application AC current applied to the battery in accordance with a first relationship corresponding to a relationship between a first magnitude and a first frequency of a preset allowed application current of the battery, a second relationship corresponding to a relationship between a second magnitude and a second frequency of the AC current determined in accordance with limitations of switching frequencies of the pair of switching elements, and a third relationship corresponding to a relationship between a third magnitude and a third frequency of the AC current derived in accordance with the preset maximum application AC voltage applicable to the battery.

2. The system of claim 1, wherein the controller determines the first relationship in accordance with the temperature of the battery.

3. The system of claim 1, wherein the controller determines the second relationship in accordance with a temperature of cooling water for cooling the pair of switching elements in the inverter.

4. The system of claim 1, wherein the controller derives the third relationship using the following formula:

$$I_{ac,max} = \frac{V_{ac,max}}{2\pi f_{inj} L_{dq}},$$

wherein $I_{ac,max}$ is a maximum value of the AC current, $V_{ac,max}$ is the preset maximum application AC voltage, $f_{inj}$ is a frequency of the AC current, and $L_{dq}$ is an equivalent inductance of the motor depending on a position of a rotor of the motor.

5. The system of claim 1, wherein the controller determines a magnitude and a frequency of the AC current satisfying all of the first relationship, the second relationship, and the third relationship to be the magnitude and the frequency of the AC current applied to the battery, determines a magnitude of the AC voltage applied to the battery in accordance with the first determined magnitude of the AC current applied to the battery, and determines switching duties of the pair of switching elements in accordance with the determined magnitude of the AC voltage.

6. The system of claim 5, wherein the controller determines switching frequencies of the pair of switching elements in accordance with the preset method of switching the pair of switching elements and the frequency of the AC current applied to the battery.

7. A method of increasing a temperature of a battery using a motor drive system comprising an inverter, which includes a plurality of legs corresponding to a plurality of phases, respectively, wherein each of the plurality of legs comprises a pair of switching elements connected in series to both terminals of the battery, respectively, and a motor comprising a plurality of coils corresponding to the plurality of phases, respectively, wherein each of the plurality of coils has one end connected to a connection node between the pair of switching elements included in each leg of the inverter, each leg corresponding to each of the plurality of coils, and other ends of plurality of coils are connected to each other, the method comprising:
   receiving, by a controller, a voltage of the battery and a position of a rotor of the motor;
   determining, by the controller, a preset maximum value of an application AC voltage applicable to the battery by a preset method of switching the pair of switching elements;
   deriving, by the controller, a first relationship corresponding to a relationship between a first magnitude and a first frequency of a preset allowed application current of the battery, a second relationship corresponding to a relationship between a second magnitude and a second frequency of an AC current determined in accordance with limitations of switching frequencies of the switching elements, and a third relationship corresponding to a relationship between a third magnitude and a third frequency of the AC current derived in accordance with the preset maximum application AC voltage applicable to the battery; and
   determining, by the controller, a fourth magnitude and a fourth frequency of an AC current satisfying all of the first relationship, the second relationship, and the third relationship to be a fifth magnitude and a fifth frequency of an AC current applied to the battery.

8. The method of claim 7, wherein, in the receiving, the controller further receives the temperature of the battery, and wherein, in the determining of the preset maximum value, the controller determines the first relationship in accordance with the received temperature of the battery.

9. The method of claim 7, wherein, in the receiving, the controller further receives a temperature of cooling water for cooling the pair of switching elements in the inverter, and
in the determining of the preset maximum value, the controller determines the second relationship in accordance with the received temperature of the cooling water.

10. The method of claim 7, wherein, in the determining of the preset maximum value, the controller derives the third relationship using the following formula:

$$I_{ac,max} = \frac{V_{ac,max}}{2\pi f_{inj} L_{dq}},$$

where $I_{ac,max}$ is a maximum value of the AC current, $V_{ac,max}$ is the preset maximum application AC voltage, $f_{inj}$ is a frequency of the AC current, and $L_{dq}$ is an equivalent inductance of the motor depending on a position of a rotor of the motor.

11. The method of claim 7, wherein, in the determining of the first magnitude and the first frequency of the AC current applied to the battery, the controller determines the fourth magnitude and the fourth frequency of the AC current satisfying all of the first relationship, the second relationship, and the third relationship to be the fifth magnitude and the fifth frequency of the AC current applied to the battery, determines a magnitude of the AC voltage applied to the battery in accordance with the first magnitude of the AC current applied to the battery, and determines switching duties of the pair of switching elements in accordance with the determined magnitude of the AC voltage.

12. The method of claim 11, wherein, in the determining of the first magnitude and the first frequency of the AC current applied to the battery, the controller determines switching frequencies of the pair of switching elements in accordance with the preset method of switching the pair of switching elements;

a preset method of switching the pair of switching elements and the frequency of the AC current applied to the battery.

* * * * *